July 21, 1942.     J. W. FITZ GERALD     2,290,421
FLEXIBLE COUPLING
Filed Aug. 1, 1941
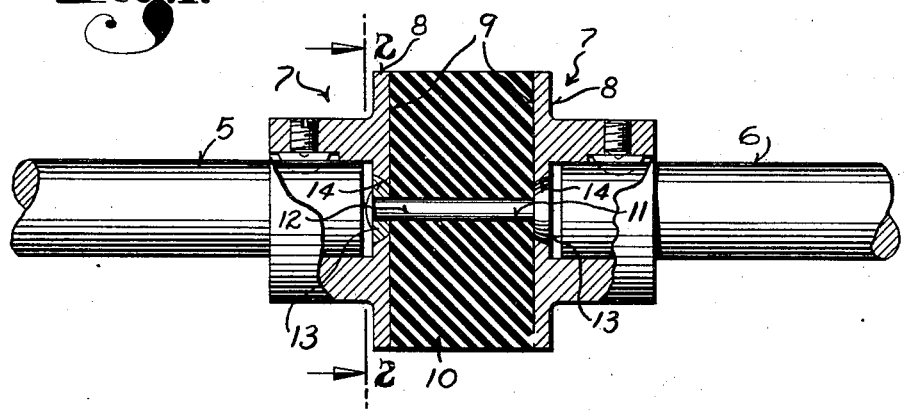
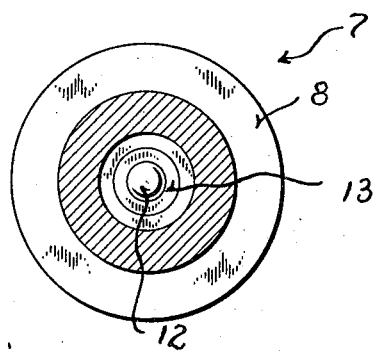
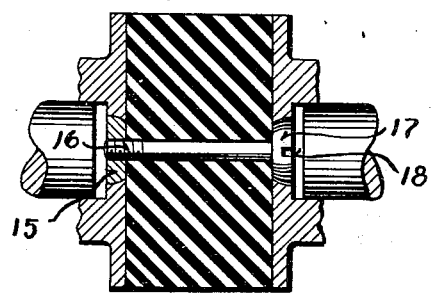
Inventor
John W. FitzGerald Patented July 21, 1942

2,290,421

UNITED STATES PATENT OFFICE 2,290,421

FLEXIBLE COUPLING

John W. Fitz Gerald, Milwaukee, Wis., assignor to Briggs & Stratton Corporation, Milwaukee, Wis., a corporation of Delaware Application August 1, 1941, Serial No. 405,017

6 Claims. (Cl. 64—11)

This invention relates to improvements in flexible couplings, and is a continuation in part of the co-pending application of John W. Fitz Gerald for Flexible coupling, Serial No. 207,034, filed May 10, 1938.

While flexible couplings broadly are not new, those heretofore in use have been unsatisfactory for some uses. In the familiar motor generator units in which the generator is driven by a small internal combustion engine the inevitable fluctuations in speed of the engine result in objectionable fluctuations on the output line of the generator. As a consequence, if the unit is used to energize a lighting circuit, these fluctuations cause a flicker in the lights.

This inevitable fluctuation in speed consistency can be compensated for or "ironed out" by transmitting the driving torque from the engine to the generator through a suitable resilient coupling, but couplings heretofore available did not function satisfactorily and because they embodied springs and other mechanical devices were too complicated and expensive for the smaller installations.

This invention, therefore, contemplates as one of its objects to provide an improved coupling which attains an adequate degree of resiliency or flexibility to "iron out" fluctuations in the speed of an internal combustion engine due to the successive impulses of the power stroke, and to insure uniform speed for the driven generator or other machine with which the engine is connected entirely without the use of springs.

It is also an object of this invention to provide a coupling of the character described which is so designed that the extent of its resiliency is readily controllable and if desired may be made adjustable.

More specifically, it is an object of this invention to provide a coupling of the character described which consists merely of a block of rubber or other material having suitable cubicle elasticity maintained under compression and in which the driving force is transmitted by the rubber block from the driving element to the driven element solely through frictional engagement and wherein the means employed for holding the rubber block in compression is so constructed as to permit limited axial offset and angular misalignment between the driving and driven elements.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates two complete examples of the physical embodiment of the invention constructed in accordance with the best modes so far devised for the practical application of the principles thereof, and in which:

Figure 1 is a view partially in side elevation and partially in longitudinal section showing a coupling constructed in accordance with this invention;

Figure 2 is a cross sectional view taken through Figure 1 on the plane of the line 2—2; and Figure 3 is a view similar to Figure 1 illustrating a slightly modified embodiment of the invention.

Referring now particularly to the accompanying drawing in which like numerals indicate like parts throughout the several views, the numerals 5 and 6 represent two shafts normally axially aligned and arranged end to end. One of these shafts may be considered the driving element and the other the driven element. The adjacent ends of the shafts are spaced apart and carry collars 7 thereon. Each collar has a flange 8 and is secured to its shaft by means of a key and set screw with its flange 8 outermost. The outer faces 9 of the flanges 8 are thus directly opposite and when the shafts are axially aligned are parallel.

Disposed between the parallel faces 9 is a connecting member 10. The connecting member 10 is formed of rubber or other material having suitable cubicle elasticity and while its cross sectional shape may be varied, it is conveniently formed in the nature of a disc having an axial aperture 11 as shown. There is no connection between the connecting member and the flanges 8 except that afforded by frictional engagement between the ends of the disc and the adjacent faces of the flanges, and to maintain this frictional grip, the rubber connecting member is held in endwise compression by means of a central tie rod 12 passing through the axial aperture 11 in the connecting member.

The tie rod 12 has spherical heads 13 at each end thereof engaged in correspondingly shaped spherical sockets 14 in the flanges 8 to hold the faces 9 of the flanges in frictional contact with the ends of the rubber disc with a force sufficient to provide a frictional driving connection between the shafts.

As will be readily appreciated the swivel connection thus produced between the ends of the tie rod and the collars 7 permits a degree of axial offset and angular misalignment between the driving and driven elements.

Obviously, the driving connection between the driving and driven elements established by placing the connecting member under compression has a degree of resiliency allowing relative torsional movement between the driving and driven elements, and the extent of this resiliency is determined by the degree of compression to which the rubber connecting member is subjected and its cross-sectional shape. Hence, through choice of these factors the extent of resiliency of the coupling can be controlled.

In this connection it is to be observed that one of the spherically formed heads on the tie rod 12 may be in the form of a nut 15 threaded on the tie rod as shown at 16 in Figure 3, for the purpose of permitting regulation of the compressive force to which the rubber connecting member is subjected. In this embodiment of the invention the other of the spherical heads 17 which is preferably integral with the tie rod is provided with a screw slot 18 to facilitate adjustment. Obviously, such adjustment is readily effected upon removal of the coupling from the shafts.

From the foregoing description taken in connection with the accompanying drawing it will be readily apparent to those skilled in the art that this invention provides an exceptionally simple flexible coupling which because of its simplicity and low cost is admirably suited for use in small portable electric lighting plants wherein an electric generator is driven directly from a small internal combustion engine.

What I claim as my invention is:

1. A coupling of the character described comprising: a pair of substantially axially arranged rotatable members having spaced apart opposing friction faces; a resilient and deformable friction element disposed between the friction faces of said rotatable members; and an axial tie member passing through a central aperture in the friction element and connected with said rotatable members so as to hold the friction element under compression between said friction faces to thereby establish a resilient frictional driving connection between the rotatable members, said connection between the tie member and the rotatable members comprising spherical portions at the ends of said tie member engaged in correspondingly shaped sockets in the rotatable members for permitting angular misalignment and axial offset between the drivingly connected rotatable members.

2. A coupling of the character described comprising: a pair of substantially axially arranged rotatable members having spaced apart opposing friction faces; an axial tie member extending between said rotatable members; a swivel connection between each end of the tie member and the rotatable member adjacent thereto operable to permit angular misalignment and axial offset between said rotatable members and to limit movement of said rotatable members apart; and a resilient and deformable friction element encircling the tie member and confined under compression between the friction faces of the rotatable members whereby portions at opposite ends of the friction element are at all times frictionally engaged with said friction faces to establish a resilient driving connection between the rotatable members.

3. A coupling of the character described comprising: a pair of substantially axially arranged rotatable members having spaced apart opposing friction faces; a resilient and deformable friction element disposed between the friction faces of said rotatable members; an axial tie member passing through central apertures in the friction element and said friction faces; and spherically shaped heads on the ends of said tie member engageable in correspondingly shaped sockets in the rotatable members for holding the friction element under compression between said friction faces and thereby establishing a resilient frictional driving connection between the rotatable members, one of said spherically shaped heads on the tie member being adjustable longitudinally of the tie member to provide for adjustment of the spacing between said friction faces and consequently regulation of the effectiveness of the resilient frictional driving connection between the rotatable elements.

4. A coupling of the character described comprising: a pair of substantially axially arranged rotatable members having spaced apart opposing friction faces; a resilient and deformable friction element disposed between the friction faces of said rotatable members; an axial tie member passing through central apertures in the friction element and said friction faces; and spherically shaped heads on the ends of said tie member engageable in correspondingly shaped sockets in the rotatable members for holding the friction element under compression between said friction faces and thereby establishing a resilient frictional driving connection between the rotatable members, one of said spherically shaped heads on the tie member being adjustable longitudinally of the tie member to provide for adjustment of the spacing between said friction faces and consequently regulation of the effectiveness of the resilient frictional driving connection between the rotatable members, the engagement of said spherically shaped heads in the correspondingly shaped sockets of the rotatable members providing a swivel connection between the rotatable members permitting angular misalignment and axial offset between the drivingly connected rotatable members.

5. A coupling of the character described comprising: a pair of substantially axially arranged rotatable members having confronting friction faces; a single tie member disposed substantially on the axis of rotation of said rotatable members and connected thereto for limiting motion of said friction faces apart; and a resilient and deformable friction element confined between said confronting friction faces under a degree of compression such that the rotatable members are resiliently frictionally drivingly connected one with the other.

6. A coupling of the character described comprising: a pair of substantially axially arranged rotatable members having confronting friction faces; adjustable means disposed axially of said rotatable members for limiting motion of said friction faces apart and for drawing said friction faces toward each other; a swivel connection between said adjustable limiting means and the rotatable members permitting angular misalignment and axial offset between the rotatable members; and a resilient and deformable friction element confined between said confronting friction faces under a degree of compression such that the rotatable members are resiliently frictionally drivingly connected with each other.

JOHN W. FITZ GERALD.